(12) United States Patent
Patil et al.

(10) Patent No.: US 10,678,826 B2
(45) Date of Patent: Jun. 9, 2020

(54) INTERACTIVE VISUALIZATION FOR OUTLIER IDENTIFICATION

(71) Applicant: SAP SE, Walldorf (DE)

(72) Inventors: Shailesh Patil, Maharashtra (IN);
Elavarasi Ravi, Tamilnadu (IN);
Thunuguntla Vatsalya, Hyderabad (IN)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 15/659,206

(22) Filed: Jul. 25, 2017

(65) Prior Publication Data

US 2019/0034526 A1 Jan. 31, 2019

(51) Int. Cl.
G06F 16/34 (2019.01)
G06F 3/0482 (2013.01)
G06F 3/0481 (2013.01)

(52) U.S. Cl.
CPC .......... *G06F 16/345* (2019.01); *G06F 3/0481* (2013.01); *G06F 3/0482* (2013.01)

(58) Field of Classification Search
None
See application file for complete search history.

(56) References Cited

U.S. PATENT DOCUMENTS

| 7,581,193 | B2 | 8/2009 | Koran et al. |
| 8,640,056 | B2 | 1/2014 | Helfman et al. |
| 8,990,258 | B2 | 3/2015 | Bhatia |
| 9,015,591 | B2 | 4/2015 | Liensberger et al. |
| 9,043,302 | B1 | 5/2015 | Efron et al. |
| 9,396,240 | B2 | 7/2016 | Le et al. |
| 9,424,318 | B2 | 8/2016 | Wongsuphasawat et al. |
| 9,501,540 | B2 | 11/2016 | Parker et al. |
| 9,747,642 | B1* | 8/2017 | Counihan ............... G06Q 40/04 |
| 2006/0101048 | A1 | 5/2006 | Mazzagatti et al. |
| 2007/0088534 | A1* | 4/2007 | MacArthur ........ G05B 13/0295 703/17 |
| 2009/0002373 | A1* | 1/2009 | MacGregor ........... G06F 17/246 345/440.2 |
| 2009/0013271 | A1 | 1/2009 | Helfman et al. |
| 2009/0085555 | A1* | 4/2009 | Heerema ................ G01R 23/18 324/76.27 |
| 2010/0161607 | A1* | 6/2010 | Singh ..................... G16B 50/00 707/737 |

(Continued)

FOREIGN PATENT DOCUMENTS

CN 104462802 A 3/2015

OTHER PUBLICATIONS

"Violin plot," Wikipedia, Jun. 2, 2017, https://en.wikipedia.org/w/index.php?title=Violin_plot&oldid=783408488, pp. 1-2 (Year: 2017).*

(Continued)

*Primary Examiner* — Richard L Bowen
(74) *Attorney, Agent, or Firm* — Klarquist Sparkman, LLP

(57) ABSTRACT

Techniques are provided for processing, visualizing, interpreting, and otherwise utilizing collected data. More particularly, collected data may be visually represented in an interactive manner, which allows a user, for example, to define and identify outlier data within a very large dataset. These results may be obtained through the use of a customizable, interactive visualization of the data, in which outliers and other aspects of the data are visually apparent.

20 Claims, 10 Drawing Sheets

(56) References Cited

U.S. PATENT DOCUMENTS

| | | | |
|---|---|---|---|
| 2013/0275904 A1 | 10/2013 | Bhaskaran et al. | |
| 2014/0182350 A1* | 7/2014 | Bhavaraju | G01M 99/008 |
| | | | 73/1.02 |
| 2015/0379429 A1* | 12/2015 | Lee | G09B 5/00 |
| | | | 706/11 |
| 2016/0094497 A1* | 3/2016 | Javed | G06F 16/95 |
| | | | 709/206 |
| 2016/0179852 A1 | 6/2016 | Naibo et al. | |
| 2016/0342304 A1 | 11/2016 | Carter et al. | |
| 2018/0158145 A1* | 6/2018 | Weigel | G06Q 40/06 |
| 2018/0225270 A1* | 8/2018 | Bhide | G06F 40/16 |
| 2018/0330250 A1* | 11/2018 | Nakayama | G06Q 10/04 |

OTHER PUBLICATIONS

Kung, Sun-Yuan, "Visualization of big data." Cognitive Informatics & Cognitive Computing (ICCI* CC), 2015 IEEE 14th International Conference on. IEEE, 2015, 2 pages.

"Built for Fast Visual Analytics", Zoomdata, retrieved from https://www.zoomdata.com/product/, downloaded on Mar. 9, 2017, 7 pages.

"How to Effectively Realize Data Visualization", SAS Conclusions Paper, SAS Institute Inc, retrieved from http:// resources.idgenterprise.com/original/AST-0087741_HowToEffectivelyRealize.pdf, dowloaded on Mar. 9, 2017, 13 pages.

Ray, "How to Create BoxPlot Chart in Qlikview? Analytics Vidhya", retrieved from https://www.analyticsvidhya.com/blog/2015/01/create-box-plot-qlikview/, Jan. 20, 2015, 14 pages.

\* cited by examiner

INTERACTIVE VISUALIZATION FOR OUTLIER IDENTIFICATION

TECHNICAL FIELD

This description relates to graphical user interfaces for providing visualization techniques.

BACKGROUND

Conventional computer systems and related hardware (e.g., sensors) are capable of capturing and storing large amounts of data. Moreover, existing processors, memories, and associated software are capable of performing many types of processing of such data.

Nevertheless, it remains difficult for users to interpret or otherwise utilize such data. For example, existing processing techniques may not scale adequately for extremely large quantities of data. Moreover, even to the extent the data is processed, users of the data may not be able to characterize or understand the processed data.

For example, users may not be able to determine whether or how particular portions of the data are meaningful, or whether some of the data should be discarded or ignored. Further, making such determinations, even if technically feasible, may require knowledge and effort on the part of the user that relatively few users may possess. As a result, the value of collected data is often not fully realized.

SUMMARY

Techniques are provided for processing, visualizing, interpreting, and otherwise utilizing collected data. More particularly, collected data may be visually represented in an interactive manner, which allows a user, for example, to define and identify outlier data within a very large dataset. These results may be obtained through the use of a customizable, interactive visualization of the data, in which outliers and other aspects of the data are visually apparent.

The described techniques are useful, for example, in visualizing data in which data values do not always follow a well-defined distribution. The interactive nature of the described techniques provides a visual overview of such a dataset, thereby enabling exploratory analysis of such non-parametric distributions. Consequently, for example, users may be provided with an ability to determine bounds of normal data, and otherwise interpret collected data, even if the users do not have extensive programming or data processing expertise or training.

The details of one or more implementations are set forth in the accompanying drawings and the description below. Other features will be apparent from the description and drawings, and from the claims.

DETAILED DESCRIPTION

Figure 1:
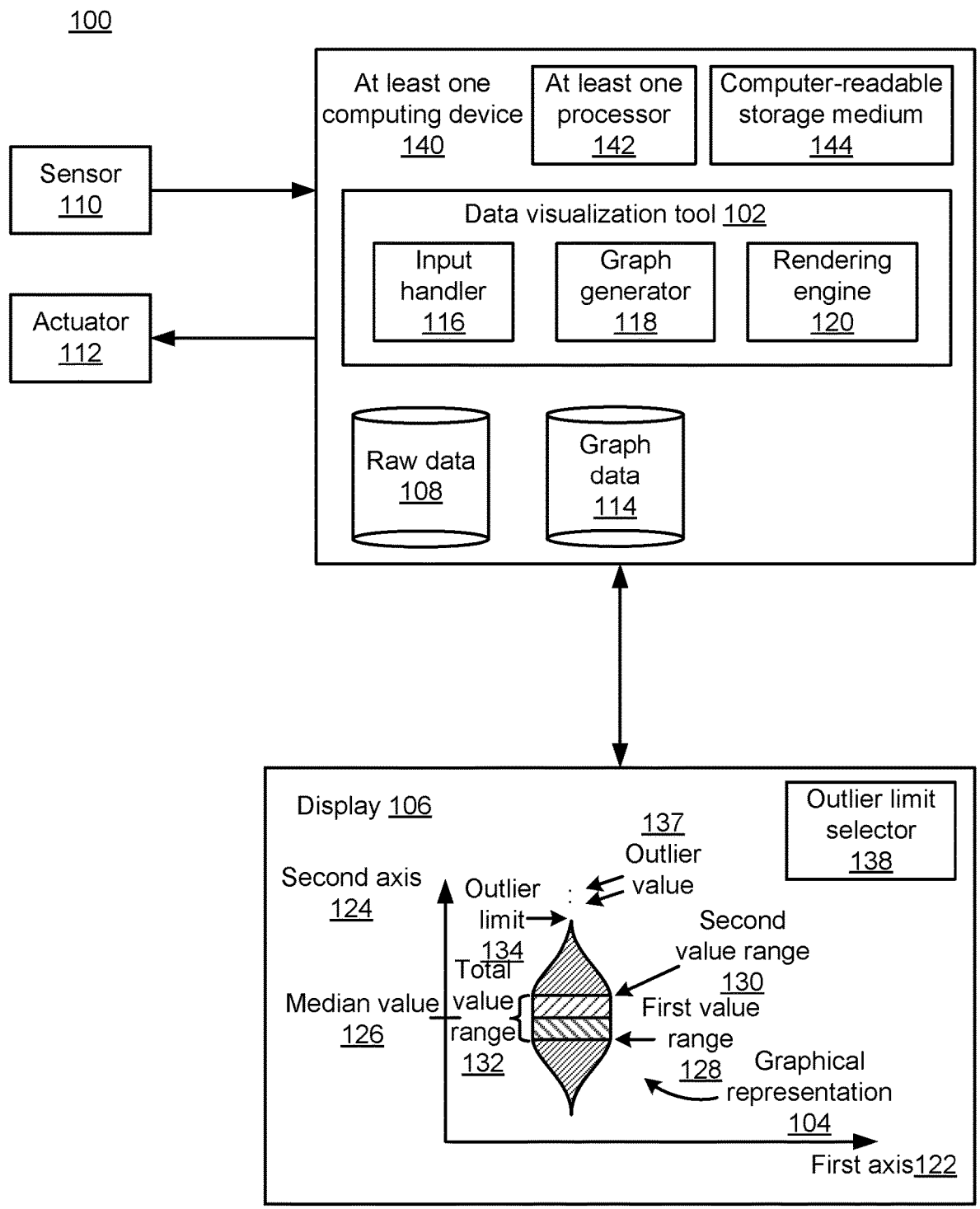
FIG. 1 is a block diagram of a system for interactive visualization for outlier identification.

FIG. 1 is a block diagram of a system 100 for interactive visualization for outlier identification. In the example of FIG. 1, a data visualization tool 102 is configured to provide at least one graphical representation 104 on a display 106, in order to facilitate an illustration, interpretation, and use of data selected from raw data 108. In this way, as referenced above and described in detail, below, a user of the display 106 may be provided with an ability to understand aspects of the selected data that may otherwise be difficult to discern, such as outlier data values, even when a quantity of data stored within raw data 108 is very large. Moreover, as also described below, the system 100 provides the graphical representation in a dynamic, adjustable, interactive manner, so that the user is provided with an ability to obtain desired results from data analyses, even for different types and values of the raw data 108, and without required advanced technical knowledge on the part of the user.

In more detail, in the example of FIG. 1, and in the examples that follow, it is assumed for the sake of illustration that the raw data 108 is collected from at least one sensor 110. In this regard, it will be appreciated that the sensor 110 may represent a wide range, and potentially large number, of various types of sensors. In general, such sensors are designed to monitor one or more aspects or variables of surrounding environments, and then to transmit values for the monitored values for storage within the raw data 108.

In some implementations, the sensor 110 may provide at least some processing of the collected data values, prior to transmitting the collected data values. In other implementations, data may be transmitted upon collection (e.g., streamed in real time).

The sensor 110 may represent virtually any hardware and/or software designed to execute such data collection and transmission. For the sake of illustration and non-limiting example, the sensor 110 may represent any sensor designed to track visual, audio, or vibrational data within an area, or designed to track metrics characterizing a functionality of a machine(s) or device(s). For example, the sensor 110 may be deployed in the context of the Internet of Things (IoT). The sensor 110 may be deployed in various industrial, governmental, or personal (e.g., home) settings.

In the examples of FIGS. 4-16, the sensor 110 is described as monitoring operations of a turbine(s) generating electricity in an industrial environment. Again, these examples are intended merely for the sake of convenience and clarity in explaining example operations of the system of FIG. 1, and are not intended to limit the types of sensor 110 that may be used. Moreover, the system 100 may be used without the sensor 110, such as when the raw data is available from other sources, or computer-generated in a simulated or virtual context.

FIG. 1 also illustrates an actuator 112, which should be understood to correspond to any appropriate type of sensor 110 and associated context. That is, the actuator 112 corresponds to any appropriate control loop that may be formed with a corresponding sensor 110, and may operate on an item or environment monitored by the sensor 110, or on the sensor 110 itself. For example, where the sensor 110 detects a malfunction of a monitored device (not shown in FIG. 1), the actuator 112 may deactivate the monitored device. The actuator 112 also may be configured to make an adjustment to an environment of the sensor 110 in response to the sensor 110 detecting that a monitored value has exceeded a threshold, such as lowering a temperature at the sensor 110 when the sensor 110 detects that the temperature has exceeded a threshold.

As is known, the sensor 110, or other data source, may produce large quantities of data to be stored within the raw data 108. For example, the sensor 110 may continuously stream monitored values at very small/frequent intervals (e.g., more than one per second). Over a period of time, the resulting monitored values may accumulate into vary large amounts of data within the raw data 108.

The system 100 typically provides an ability to utilize the raw data 108 to monitor and govern operations of the sensor 110 and the actuator 112 (e.g., setting thresholds at appropriate levels), and/or to take appropriate action with respect to objects or environments monitored by the sensor 110. In particular, the data visualization tool 102 may be configured to provide the graphical representation 104, and to enable a user to conveniently and accurately identify and store graph data 114. As described below, the graph data 114 may represent, or include, various parameter values that have been identified and selected for storage, in conjunction with the generation of the graphical representation 104. In specific examples, such graph data 114 may include outlier values (and associated parameter values used to identify the outlier values as such) identified within selected, graphed data of the raw data 108.

In this regard, as illustrated and described in more detail, below, outlier values should be generally understood to represent collected data values from within selected portions of the raw data 108 that are outside of an expected or observed distribution or other pattern of selected data. In some use case scenarios, it may be desirable to identify and remove (filter) these outlier values. In other scenarios, however, outlier values may be valued as indicators that facilitate identification of points of (potential) failure, or other valuable information.

For example, in some scenarios, outlier values may be generated by human error (e.g., configuring the sensor 110 incorrectly), or by machine error (e.g., a malfunctioning sensor). In these cases, and similar scenarios, such outlier values are not indicative of intended results for data collection operations of the sensor 110, and may be removed in order to obtain more accurate result data.

On the other hand, outlier values may have use in other contexts or for other purposes. For example, in the examples just given, it may be highly desirable to identify and correct the human/machine error. In other scenarios, the outlier values may provide valuable insight into an unexpected, but accurate, measurement by the sensor 110. For example, a machine monitored by the sensor 110 may generate some unexpected outlier value at a certain time of day, or in response to a particular environmental stimulus. In these and similar contexts, the outlier values may provide valuable assistance in identifying, and correcting if necessary, a source of the unexpected outlier value(s).

In order to generate the graphical representation 104, the data visualization tool 102 includes an input handler 116, a graph generator 118, and a rendering engine 120. In operation, the input handler 116 may receive and store the raw data 108, and also may receive a request from a user of the display 106 for the graphical representation 104. For example, in the latter case, as described below, a user may utilize the input handler 116 to select desired portions of the raw data 108 (e.g., a specified table and associated columns thereof), as well as to provide subsequent updates during interactions with (e.g., modifications to) the graphical representation 104.

The graph generator 118 may be configured to obtain the requested data from the raw data 108, and to provide any associated processing thereof, in conjunction with any parameters or selections provided by the user. For example, the graph generator 118 may be configured to use an appropriate index to identify and retrieve the requested data from the raw data 108. The graph generator 118 may be further configured, e.g., to count a number of each occurrences/instances of data points having particular data values, and generally to characterize the data with respect to the received parameters (e.g., identify and characterize a number of outlier values).

The rendering engine 120 represents any appropriate technique(s) for receiving results from the graph generator 116 and displaying the graphical representation 104 (and associated aspects) within the display 106. That is, the rendering engine 120 is generally configured to facilitate the drawing and display of text and images, along with corresponding formatting thereof.

In this way, the graphical representation 104 may be provided in conjunction with a first axis 122, and a second axis 124. In the example of FIG. 1, the graphical representation 104 is illustrated as demonstrating a Gaussian distribution pattern. That is, it is assumed that the selected data from the raw data 108 illustrates this well-known distribution (also sometimes referred to as a normal distribution, or bell curve), in which, among other characteristics, the data is symmetric around a central median value 126.

That is, in FIG. 1, selected data represented by the graphical representation 104 is illustrated by increasing a width of the graphical representation 104 along the first axis 122, in relative or direct proportion to a count or frequency of data values at the corresponding value along the second axis 124. Thus, a width of the graphical representation 104 is greatest where a corresponding count or frequency of data values at a corresponding value of the second axis 124 is greatest, which, in the Gaussian example of FIG. 1, occurs at the median value 126. In this regard, the graphical representation 104 provides various aspects of a histogram or similar type of graph, along with associated benefits thereof.

Put another way, a frequency or count of data values included within the selected raw data is reflected by a corresponding width of the graphical representation 104 along the first axis 122, at each of the corresponding values along the second axis 124. For example, in the Gaussian distribution of the example of FIG. 1, a value of the second axis 124 that is just below (or above) the median value 126 might have a slightly smaller frequency/count of data values within the selected raw data than the frequency/count of data values at the median value 126.

Further in FIG. 1, the graphical representation 104 includes a first value range 128 and a second value range 130. As shown, the value ranges 128, 130 may be illustrated with differing visual designations, illustrated in FIG. 1 as distinct patterns of cross-hatching. In other examples, the visual designations may include the use of different colors, grey scale(s), shading, marking, highlighting, or other types of cross-hatching.

In various embodiments, the first value range 128 may be defined, e.g., by the graph generator 118, as including a certain number or percentage of data values of the selected values that are closest to the median value 126. For example, if the first value range 128 is defined as including one quarter of the total number of selected data values, then the first value range 128 may be referred to as a quartile range, or bottom quartile range. Similarly, the second value range 130 may also include one quarter of the total number of selected data values, and may thus also provide a quartile range, or top quartile range.

Thus, the value ranges 128, 130 (e.g., quartile ranges) together include the most likely or most frequent values of the selected raw data, and are defined with respect to a typical or reference value (e.g., the median value 126 in FIG. 1). Therefore, the total value range 132, in the examples using quartiles, represents an interquartile range (IQR).

In the example of FIG. 1, an outlier limit 134 is defined with respect to the total value range 132, so that outlier values 137 may be easily identified as being beyond the outlier limit 136. For example, the outlier limit 136 may be established as a multiple of the total value range 132. In examples in which the total value range 132 represents the IQR, therefore, the outlier limit 136 may be defined as three times the IQR, or 1.5 times the IQR, or some other appropriate or desired multiple.

In particular, as referenced above, the graphical representation 104 has interactive features, including an outlier limit selector 138. For example, the outlier limit selector 138 may be configured to allow a user to select the multiple of the total value range 132 (e.g., IQR) that will be used to define the outlier limit 136, or to otherwise select or define the outlier limit 136.

In this way, the user may experiment with helpful visualizations of different outlier limits, as well as the resulting outlier values. Moreover, as described below with respect to FIGS. 12 and 14, the graph generator 118 and the rendering engine 120 may be configured to calculate and display, respectively, total outlier counts of outlier values existing above the outlier limit 136, and/or a percentage of outlier values relative to a total number of data values represented by the graphical representation 104.

Consequently, then, a selection by the user of a different outlier limit 136 using the outlier limit selector 138 will result in a corresponding, updated outlier limit 136, as well as a smaller or larger number/percentage of outlier values 137. The graph generator 128 may calculate the updated outlier limit, based on the selection made using the selector 138, and also calculate an updated count/percentage of outlier values. The rendering engine 120 may then display the updated outlier limit designating the updated outlier values, along with the updated outlier count/percentage.

Thus, it will be appreciated that the graphical representation 104 may be updated on a dynamic basis. As illustrated and described below with respect to FIG. 2, the outlier limit 136 may be provided in conjunction with a corresponding visual designation (e.g., color, highlighting, or hatching), so that the outlier values 137 are also easily identified as such in a visual way.

Figure 2:
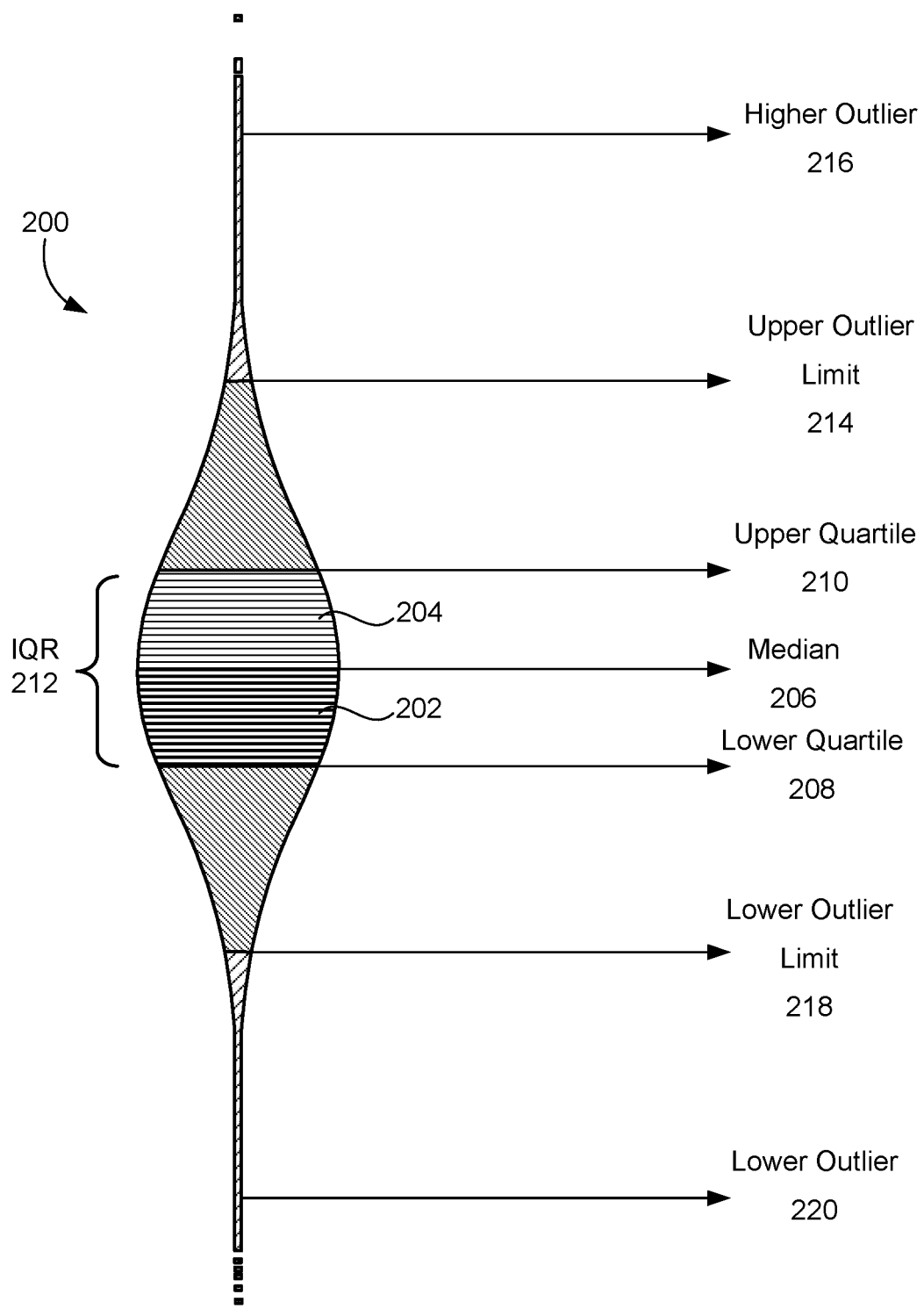
FIG. 2 is an illustration of an example graphical representation of the system of FIG. 1.

The following FIGS. 2-16, and associated descriptions, provide numerous further details and examples regarding the generation, rendering, and updating of various types of graphical representations. For example, the data visualization tool 102 may be configured to generate a plurality of graphical representations side-by-side within the display 106 and in the context of the axes 122, 124. For example, different distributions may be selected and illustrated as corresponding to individual, selected columns of one or more tables of the raw data 108, and displayed together within the display 106, for the sake of comparison. Further, although FIGS. 1 and 2 are provided with respect to illustration of a Gaussian distribution, it will be appreciated that various other types of data distributions may be calculated and displayed using the techniques described herein, some of which are referenced below, with respect to FIGS. 12 and 14.

Any or all of the various parameters and resulting graphical representations (and associated parameters or values) may be stored within the graph data 114. For example, selected raw data, or subsets thereof, may be stored within the graph data 114. Similarly, the graphical representation 104 itself, as well as selected outlier limits and outlier value counts/percentages, also may be stored using the graph data 114.

Finally with respect to FIG. 1, the data visualization tool 102 is illustrated as being executed using at least one computing device 140, which itself includes at least one processor 142 and a non-transitory computer readable storage median 144. For example, the at least one computing device 140 may represent one or more computing devices configured to implement the data visualization tool 102 by causing the at least one processor 142 to access corresponding instruction stored using the non-transitory computer readable storage median 144.

Of course, as is apparent, the at least one computing device 140 is intended as a highly simplified representation of the types of computing devices that may be utilized to provide the data visualization tool 102, and therefore does not explicitly illustrate various known hardware/software components that may be utilized in the various implementations of the system 100. For example, the at least one computing device 140 may include a monitor or other appropriate display device for providing the display 106, network-related hardware/software for enabling network communications between the various components of the data visualization tool 102, as needed, and between the various databases (e.g., raw data 108, or graph data 114), and various other input/output and other human interface components.

Further, although the data visualization tool 102 is illustrated as including a number of separate, discrete components, it will be appreciated that any two or more components or sub-components may be combined for operation of the single component, while, conversely, a single component may have two or more of its functions implemented using two or more separate components.

In various embodiments, as described below, e.g., with respect to FIG. 4, the system 100 may be implemented in an architecture in which the at least one computing device 140 represents one or more back-end devices (e.g., web server, application server, or database system) that are configured to store, maintain, and process data. Such architectures may include a front-end device that is used on a client side to render and display the graphical representation 104 (e.g., a personal computer, mobile device, or workstation) using the display 106, such as may occur with a suitable browser application or other display software. As with most such back-end/front-end architectures, a manner and extent to which various features and functionalities are provided using the back-end, as opposed to the front-end, may be at least partially configurable, e.g., by a provider of the data visualization tool 102 or other administrator.

FIG. 2 is an illustration of an example graphical representation 200 of the system of FIG. 1. Specifically, as shown, the graphical representation 200 provides an example of the graphical representation 104 of FIG. 1, and is assumed to be constructed in a manner similar to the construction of the graphical representation 104 of FIG. 1, with additional or alternative construction techniques being provided in conjunction with the various additional examples, below.

In FIG. 2, a first value range 202 and a second value range 204 are illustrated with respect to a median 206. The first value range is defined with respect to a lower quartile 208, while the upper value range is defined with respect to an upper quartile 210. Thus, the total value range defined by the ranges 202, 204 define an inter-quartile range (IQR) 212.

Accordingly, an upper outlier limit 214 may be defined with respect to (e.g., as a multiple of) the IQR 212. In this way, higher outlier values 216 may be defined with respect to the upper outlier limit 214. Similarly, a lower outlier limit 218 may be defined with respect to (e.g., as a multiple of) the IQR 212. In this way, lower outlier values 220 may be defined with respect to the lower outlier limit 218.

As shown, the various ranges and regions of the graphical representation may be represented using corresponding, selected visual designations. Although the example of FIG. 2 illustrates the use of cross-hatching for the visual designations, it will be appreciated, as already referenced, that any suitable visual designations may be used. For example, different colors, highlighting, or shading, or combinations thereof, may be used.

Figure 3:
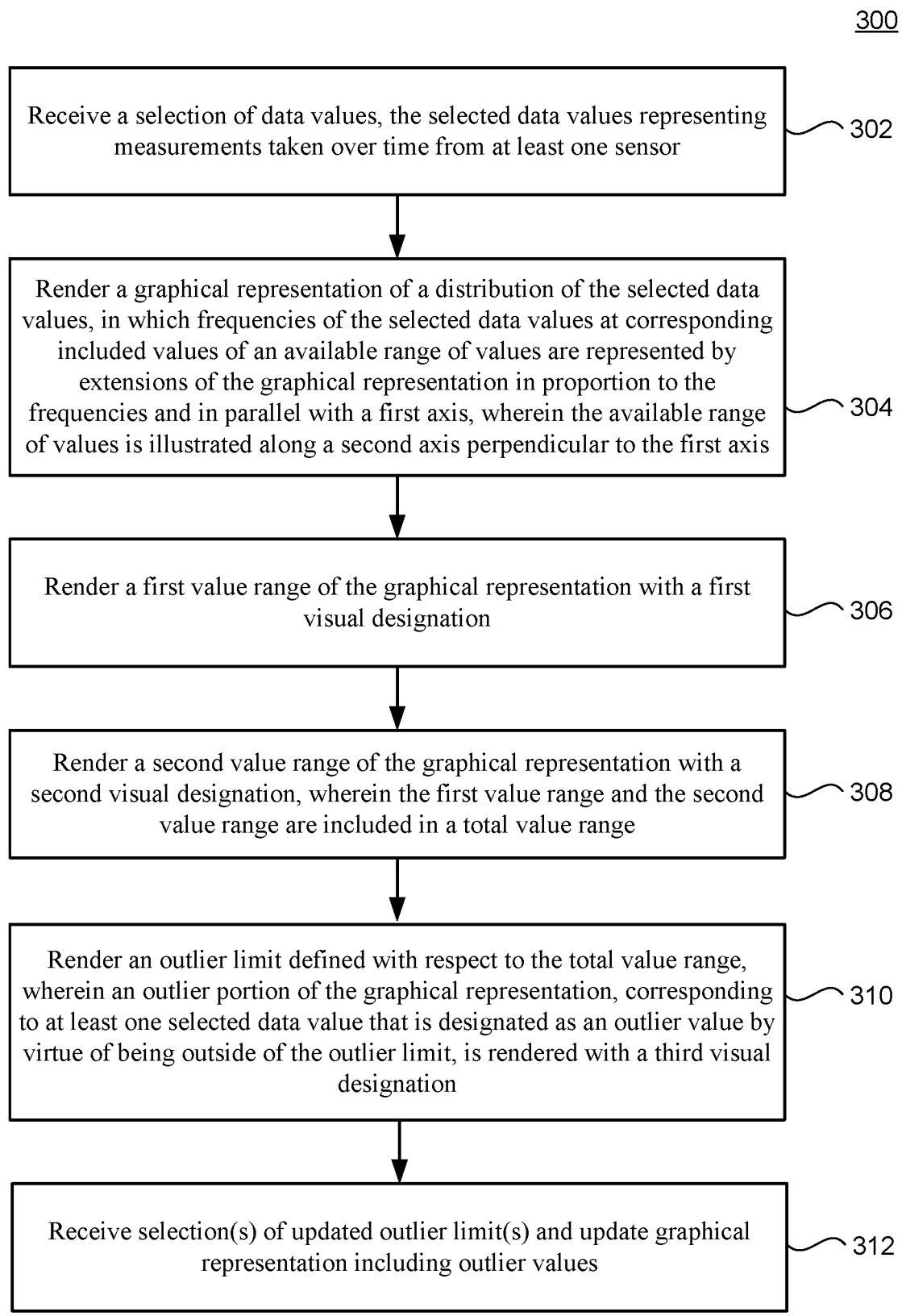
FIG. 3 is a flowchart illustrating example operations of the system of FIG. 1.

FIG. 3 is a flowchart illustrating example operations of the system of FIG. 1. In the example of FIG. 3, operations 302-312 are illustrated as separate, sequential operations. In various implementations, additional or alternative operations or sub-operations may be included, and/or one or more operations or sub-operations may be omitted. In all such implementations, any two or more operations or sub-operations may be executed in a partially or completely overlapping or parallel manner, or in a nested, iterative, looped, or branched fashion.

In the example of FIG. 3, a selection of data values is received, the selected data values representing measurements taken over time from at least one sensor (302). For example, the input handler 116 of the data visualization tool 102 may receive data values stored within the raw data 108. Subsequently, a user of the data visualization tool 102 may select the selected data values from the raw data 108. For example, as referenced above and described in more detail below, the input handler 116 may provide one or more graphical user interfaces and associated screens, with which a user may identify and select portions of the raw data 108 to serve as the selected data values. For example, the user may be provided with an ability to select individual columns of identified tables stored within the raw data 108.

A graphical representation of a distribution of the selected data values may be rendered, in which frequencies of the selected data values at corresponding included values of an available range of values are represented by extensions of the graphical representation in proportion to the frequencies and in parallel with the first axis, wherein the available range of values is illustrated along a second axis perpendicular to the first axis (304). For example, the graph generator 118 may determine a minimum available value from within the selected data values and defined along the second axis 124 of the display 106, while also identifying a maximum available value to be defined with respect to the second axis 124. A resulting available range of values between the minimum and maximum values will therefore contain all of the selected data values represented by, and within, the graphical representation 104.

The graph generator 118 may also be configured to calculate included frequencies of individual data values of the selected data values. For example, using the median value 126 as an example, it may occur that the selected data values include a particular number or count of selected data values that occur at the median value 126. Accordingly, as illustrated and described, the median value 126 is represented by an extension of the graphical representation 104 in parallel with the first axis 122, and in direct proportion to the determined frequency/count of the median value 126.

In the example of the normal distribution of the graphical representation 104, the median value 126 may be the most frequent data value counted within the graphical representation 104, so that the graphical representation 104 is widest along the first axis 122 at the median value 126. Meanwhile, values along the second axis 124 that are above and below the median value 126 have frequencies/counts that are less than the median value 126, so that a width of the graphical representation 104 generally decreases in either direction along the second axis 124 and away from the median value 126, resulting in the spindle-shape of the graphical representation 104 illustrated in FIG. 1.

Of course, it will be appreciated that the graphical representation 104 is intended merely for the sake of illustration and example, and should not be considered limiting with respect to other shapes and characteristics of the graphical representations provided by the data visualization tool 102. For example, it may occur that the selected data values do not represent or provide a perfect Gaussian or normal distribution. In other examples, some of which are described and illustrated below, a generated graphical representation may have properties associated with other types of distributions, such as exponential distributions.

As also described in more detail below, the rendering engine 120 may be configured to render the graphical representation 104 within the display 106, e.g., within a suitable browser application, or other type of display software. As also described, in some implementations, the rendering engine 120 may determine a measure or characteristic of the display 106 that will be used for rendering the graphical representation 104. For example, the rendering engine 120 may determine a pixel count representing a number of available pixels of the display 106 that may be used to render the graphical representation 104. In such implementations, the rendering engine 120 may determine a ratio of selected data values per pixel, and may then render the graphical representation 104 in conjunction with the determined ratio.

For example, it may occur that the display 106 provides 200 pixels to be used to display the graphical representation 104, while the selected data values to be included within the distribution of the graphical representation 104 may be many orders of magnitude larger than this available pixel count, e.g., may include 2 million or more selected data values. In these and similar scenarios, it may be impossible, impractical, or undesirable to attempt to include all, or even a majority, of the selected data values within the available number of pixels. Put another way, the available resolution of the display 106 may simply be insufficient to display and render individual selected data values within the graphical representation 104, so that the rendering engine 120 may instead include a predetermined number of selected data values within each available pixel.

In this way, the graphical representation 104 may be rendered in a variety of sizes, corresponding to a potentially large variety of sizes of the display 106. Further, this technique reduces a quantity of data values that are required to be transmitted between the at least one computing device 140 and the display 106, in scenarios in which the display 106 is provided at a separate client computing device that is connected to the at least one computing device 140 by way of an appropriate computer network, such as the Internet.

A first value range of a graphical representation may be rendered with a first visual designation (306). For example, the rendering engine 120 may render the first value range 128 of the graphical representation 104 with a first visual designation, such as an appropriate color, highlighting, or hatching. As described herein, in the more specific example of FIG. 2, the first value range may represent a lower quartile of data values of the selected data values, as represented by the value range 202 of FIG. 2.

A second value range of the graphical representation may be rendered with a second visual designation, wherein the first value range and the second value range are included in a total value range (308). For example, the rendering engine 120 may render the second value range 130 of the graphical representation 104, or the range 204 of FIG. 2, each with a second visual designation that is visually distinguishable from each corresponding first value range 128, 202, respectively. As also shown and described, the value ranges 128, 130 of FIG. 1 may be included within a total value range 132, while the value ranges (quartiles) 202, 204 are included within the interquartile range 212. In the examples, as shown, the individual value ranges 128, 130 of FIG. 1, and 202, 204 of FIG. 2, are rendered adjacent to one another within the corresponding, respective total value ranges 132, 212, and on either side of the corresponding, respective median values 126, 206.

It will be appreciated that the first visual designation and the second visual designation may be the same, similar, or different. For example, with respect to FIG. 2, the quartiles 202, 204 may be provided in the same color, or two different colors.

An outlier limit defined with respect to the total value range may be rendered, wherein an outlier portion of the graphical representation, corresponding to at least one selected data value that is designated as an outlier value by virtue of being outside of the outlier limit, is rendered with a third visual designation (310). For example, the rendering engine 120 may be configured to determine the outlier limit 136 of FIG. 1, and render the outlier value 137 outside of the outlier limit 136, and visually designated as representing outlier values. As illustrated and described, the outlier limit 136 of FIG. 1 may be defined with respect to, e.g., as a multiple of, the total value range 132. Similarly, the upper outlier limit 214 of FIG. 2 may be defined with respect to, e.g., as a multiple of, the IQR 212, so that higher outlier value 216 may be visually designated as outlier values within the example of FIG. 2. As will be appreciated, similar comments would apply to the lower outlier limit 218, and associated, lower outlier values 220 of FIG. 2.

In the example rendering operations of the example of FIG. 3, it will be appreciated from the description of FIG. 1 that operations of the rendering engine 120 are generally supported by underlying operations of the graphic generator 118. For example, the graph generator 118 may be configured to calculate a number of values within each of the value ranges described herein. For example, the graph generator 118 may calculate a number of data values representing a quartile of data values, such as the quartile data values within the lower quartile data value range 202 of FIG. 2. As also described, the graph generator 118 may be configured to calculate the outlier limits (e.g., outlier limit 136 of FIG. 1, or outlier limits 216, 218 of FIG. 2), so that the rendering engine 120 may proceed to utilize the calculated values to render the corresponding graphical representations of FIGS. 1 and 2.

As also described, the outlier limit selector 138 may be configured to receive dynamic, interactive selections of, and updates to, the various outlier limits (312). The graph generator 118 and the rendering engine 120 may then proceed to update corresponding graphical representations and associated outlier values.

Figure 4:
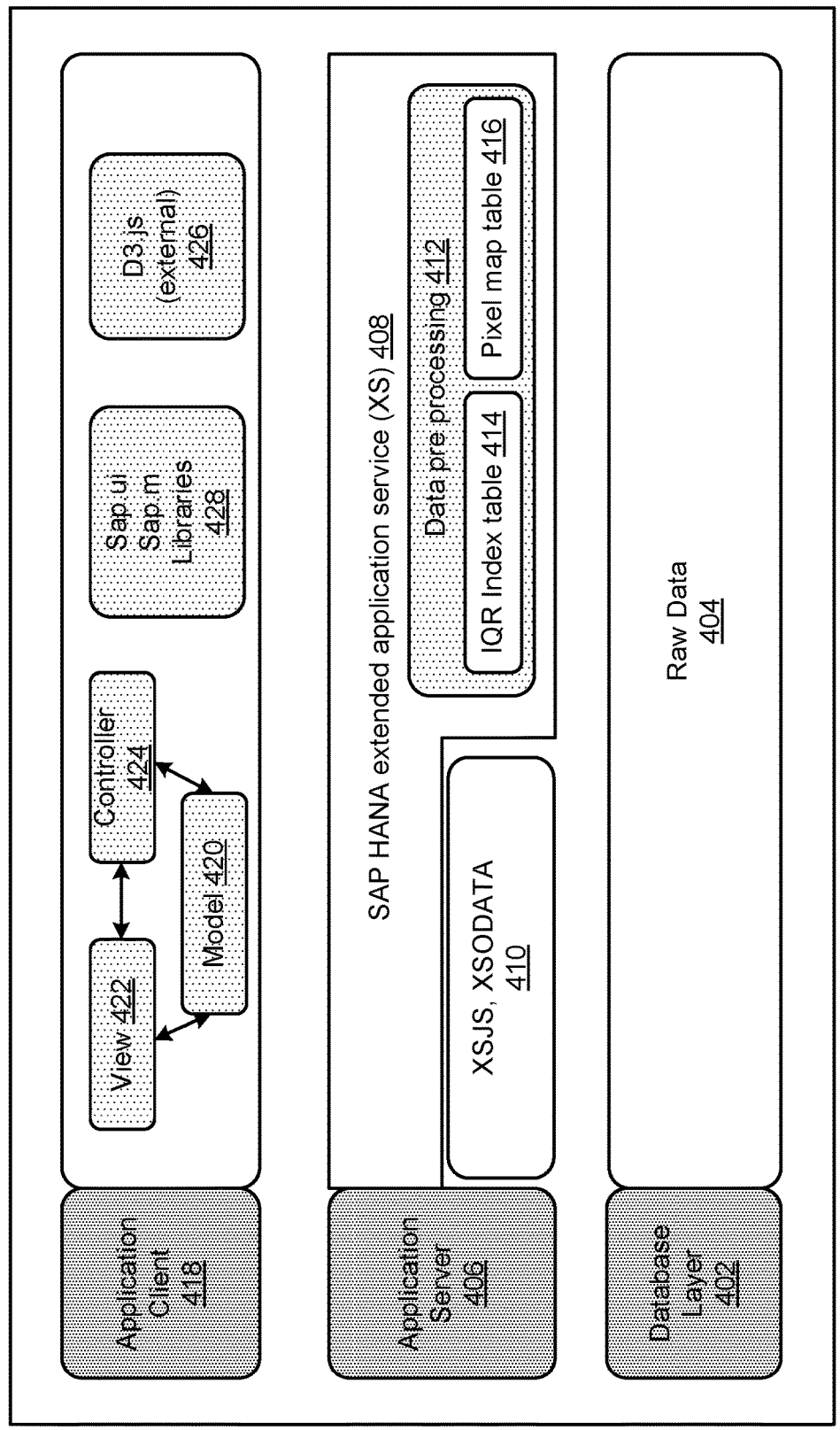
FIG. 4 is a block diagram of an example architecture of the system of FIG. 1.

FIG. 4 is a block diagram of an example architecture 400 of the system 100 of FIG. 1. In the example of FIG. 4, a database layer 402 includes, and stores, the raw data 404. In the example of FIG. 4, and generally in the context of the following examples, the database layer 402 is considered to be implemented using the HANA system as developed by SAP SE of Waldorf, Germany, or similar or related in memory or main memory database system(s). In such systems, the raw data 404 may be stored, accessed, maintained, and otherwise utilized in the context of an available main memory, e.g., volatile or RAM memory. Further, as described in detail below, the raw data 404 may be stored using column-based database tables, in which the raw data 404 is stored, organized, and accessed by column, rather than by row.

Further in FIG. 4, an application server 406 is provided a second layer of the architecture stack of the architecture 400. In the example, the application server 406 includes the SAP HANA extended application service (XS), also referred to as an XS engine. In general, the SAP HANA XS 408 represents an embedded, full-featured application server, web server, and development environment within the SAP HANA appliance itself, that is lightweight and may be utilized to implement business logic and other web services on top of the various tables and views provided by HANA in conjunction with the database layer 402 and the raw data 404. In more detail, such an XS engine may be implemented as a java script application server providing easy access to the raw data 404 using, e.g., hypertext transfer protocol- (http) based consumption, which is easy to develop and straightforward to utilize.

Of course, the XS engine 408 of FIG. 4 is provided merely as an example. In other examples, other versions may be used, such as the SAP HANA XS advanced (XSA) application server, or various other types of application servers that may be optimally utilized in conjunction with the various available types of the database layer 402.

As shown, the XS engine 408 may provide one or more techniques for exposing data, such as XSOData/XSJS 410. In this context, OData refers to an OData service for exposing data of the raw data 404 for analysis and display by one or more client applications, examples of which are provided and described below. As just referenced, OData may define operations on data resources using HTTP commands, and may also transfer or modify data using appropriate, corresponding HTTP commands.

Meanwhile, XSJS (XSJavaScript) refers to an application programming language in JavaScript that may be used to expose data, as well as to implement business logic. Whereas XS OData is relatively structured, XSJS provides a more open approach in which desired logic may be written using JavaScript. In any case, it will be appreciated that XSJS and XS OData are intended merely as examples in the context of SAP HANA, and other techniques for exposing, accessing, maintaining, or manipulating the raw data 404 with respect to an appropriate database system and/or client application may be selected and utilized by one of skill in the art.

As also illustrated with respect to the application server 406, the XS engine 408 may include a data preprocessing module 412. As shown, the data preprocessing module 412 may include an IQR index table 414, which may be constructed and utilized to provide indexing with respect to IQR values to be included, e.g., within the IQR 212 of FIG. 2. In other words, as described above with respect to FIGS. 1 and 2, the data preprocessing module 412 may represent at least a portion of an implementation of the graphic generator 118, in which the IQR index table 414 is preprocessed to determine and identify all of the values within the value ranges 202, 204, and 212.

Meanwhile, a pixel map table 416 may be constructed that represents an extent to which selected values of the raw data 404 will be condensed for representation when rendered using available pixels of a current display. That is, for example, the pixel map table 416 may include a number and position of each pixel to be used in conjunction with a graphical representation to be rendered, and relative to the number of corresponding data values to be represented by each corresponding pixel.

Finally in the example of FIG. 4, an application client 418 may be used to render and display results of operations of the application server 406. In the example, a model 420, view 422, controller 424 technique is used to render a calculated graphical representation obtained from the application server 406. In this context, the model/view/controller approach represents a software architectural pattern in which the model 420 generally represents the application's behavior, including data, logic, and rules, while the view 422 represents information that is output, and the controller 424 represents functionality for receiving user input and implementing commands for one or both of the model 420 and the view 422.

Further in FIG. 4, development libraries 428 represent preconfigured libraries of user interface elements or aspects that may be used to build and implement desired client applications. In general, a wide variety of potential controls may be included, ranging from basic UI elements to complex user interaction patterns, and designed to be combined with one another in a flexible manner. In the example of FIG. 4, SAP.ui and SAP.m libraries (where SAP.ui generally provides common control fields/buttons, and SAP.m represents a control library used for mobile devices) are illustrated, but, in practice, it will be appreciated that various other types of control libraries may be used.

The final element of the application client 418 of FIG. 4 is illustrated as a D3.js library 426, which represents a JavaScript library used to provide the dynamic and interactive nature of the various visualizations described herein, such as the graphical representation 104 of FIG. 1 and associated interactive aspects. For example, the D3.js library may utilize various appropriate standards, such as the HTML5 (hypertest markup language 5) and CSS (cascading style sheets) standards. Again, the D3.js library is intended merely as a non-limiting example of a type of rendering tool that may be used in the context of the architecture 400 and/or the system 100 of FIG. 1, and it will be appreciated that any suitable, current (or future) control library and associated rendering technologies may be utilized.

As referenced above, the sensor 110 of FIG. 1 (and associated actuator 112) may generally represent a wide variety of types of sensors an actuators that may be deployed for condition monitoring and/or performance measurements. In the following examples of FIGS. 5-16, an example from the energy sector is utilized for the sake of illustration and explanation, in which the sensor 110 is deployed in the context of a hydroelectric power plant. In particular, in the context of a hydroelectric power plant, multiple turbines may be executed together to generate a desired level of power. Each turbine may be certified to generate power within a range, where the output power is a function of available upper and lower reservoir water levels, water flow rates, and other factors. Many sensors may be deployed to measure input and output values for such turbines, where such input and output values may not necessarily follow a particular, well-defined distribution. In order to process received data, including building a prediction model with sufficient accuracy to govern operations of the actuator(s) 112), it is generally helpful or necessary to clean or filter the received data, including the removal of noise and other outliers.

In the following examples, it is assumed that the collected data is organized in a hierarchical fashion, in which each of a plurality of data schemas potentially includes a plurality of tables, and each table includes a plurality of columns of collected data. Consequently, FIG. 5 illustrates a flowchart 500 illustrating a schema selection process used with the architecture of FIG. 4, while FIG. 6 illustrates a screenshot 600 of the schema selection process of FIG. 5.

Figure 5:
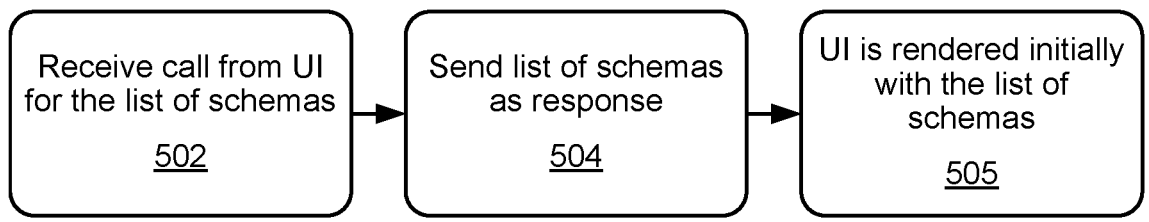
FIG. 5 is a flowchart illustrating a schema selection process used with the architecture of FIG. 4.

Specifically, in FIG. 5, a user interface may be utilized to receive a call for retrieval of a list of available schemas (502). That is, with respect to FIG. 4, the application client 418 may be utilized to make a call to the application server 406, whereupon the requested list of schemas may be identified, retrieved from the database layer 402, and returned to the applicant client 418 (504). In this way, a corresponding user interface may be rendered that includes the requested list of schemas (505).

Figure 6:
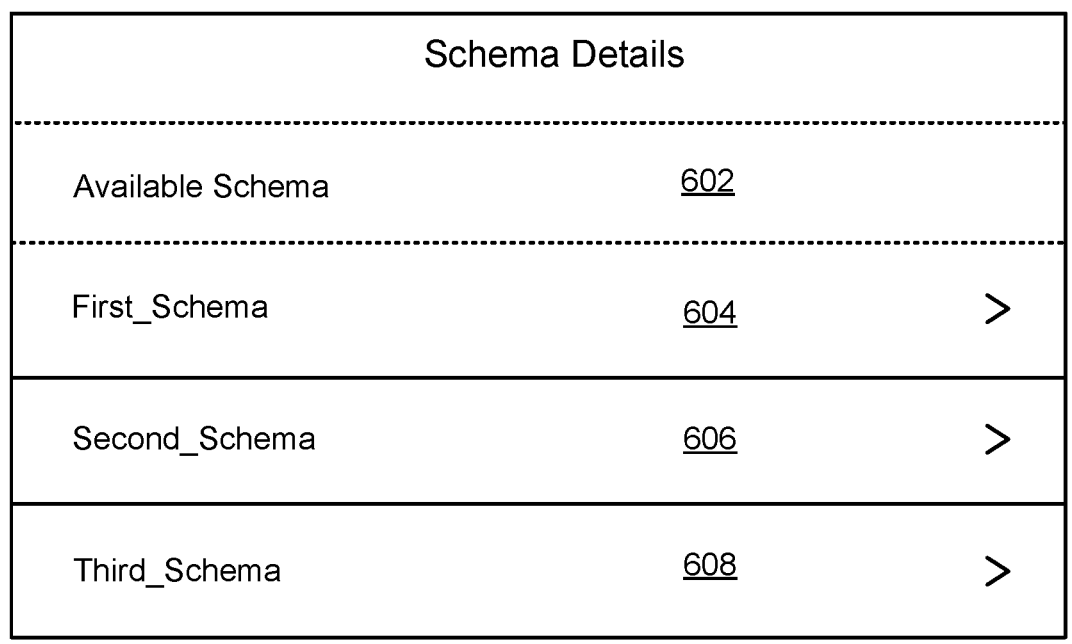
FIG. 6 is a screenshot of the schema selection process of FIG. 5.

Thus, as shown in the example screenshot 600 of FIG. 6, the available schemas 602 are rendered. In the simplified example, a first schema 604, a second schema 606, and a third schema 608 are rendered as selectable schemas that may be chosen by a user. Of course, in particular implementations, the individual schemas may be provided with names that suitably identify the various available schemas, for ease in selection thereof by the user.

Figure 7:
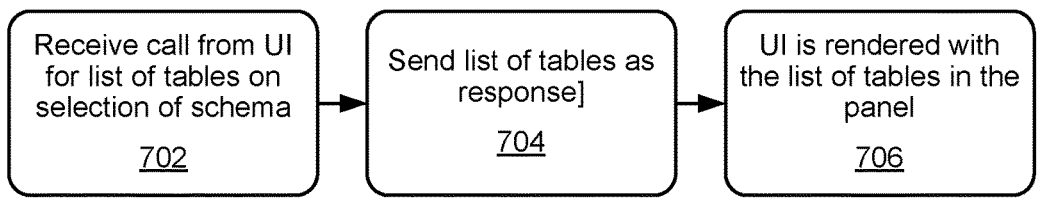
FIG. 7 is a flowchart illustrating a table selection process used with the architecture of FIG. 4.

As just referenced, each schema 604, 606, 608 may include a plurality of tables. Therefore, FIG. 7 illustrates a flowchart 700 that demonstrates a table selection process used with the architecture of FIG. 4. As shown, the application client 418 may be utilized to receive a request for a list of tables available within a selected schema (702). That is, the schema selected using the screenshot 600 may be received and passed to the application server 406k, whereupon the corresponding list of tables may be identified, retrieved from the database layer 402, and returned to the application client 418 (704). In this way, a corresponding user interface may be rendered by the application client 418, including the requested list of tables (706).

Figure 8:
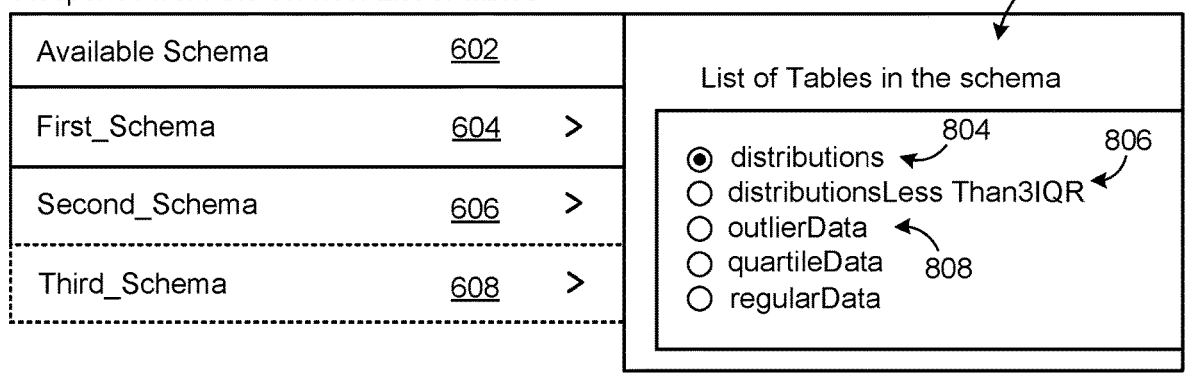
FIG. 8 is a screenshot of the table selection process of FIG. 7.

FIG. 8 is a screenshot 800 illustrating the table selection process of FIG. 7. As shown, a list 802 of tables within the selected schema 608 may be rendered. In the example of FIG. 8, the list 802 includes a distribution table 804, a table 806 including data corresponding to distributions less than 3 IQR, and a table 808 storing outlier data. More generally, the tables within the list 802 may correspond to one or more sensors and associated collected data. For example, it may occur that each of the tables of the list 802 refer to individual turbines of the hydroelectric power plant of the example referenced above. In the simplified example of FIG. 8, however, the distribution's table 804 is referenced generically as including multiple types of distributions of collected data, so that, as illustrated and described below with respect to FIGS. 9-16, various example types of data distributions that may be represented will be easily identified and understood.

Figure 9:
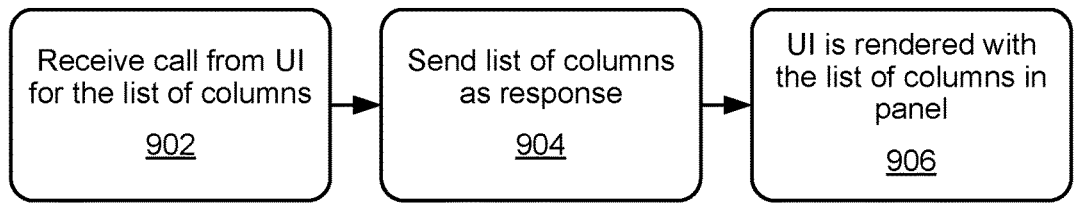
FIG. 9 is a flowchart illustrating a column selection process used with the architecture of FIG. 4.

Continuing the example in which the table 804 is selected from the list 802 of FIG. 8, FIG. 9 is a flowchart 900 illustrating a column selection process, in which one or more individual columns of the selected table 804 may be selected. In this regard, it will be appreciated that it may occur that only a subset of available columns may be of use or interest to the user. For example, some columns may include non-numeric information (e.g., names or descriptions) that is not suitable for graphing using the techniques described herein. In other examples, it may simply occur that the user is not interested in a particular, available column of data values.

In the example of FIG. 9, the user may utilize a user interface of the application client 418 to request a list of columns of the selected table 804 (902). In response, the application server 406 may receive the request for the list of columns, and interface with the database layer 402 to thereby obtain and provide the requested list of columns as a response to the application client 418 (904). Finally in FIG. 9, the application client 418 may proceed to render a user interface that includes the list of columns within a rendered panel (906).

Figure 10:
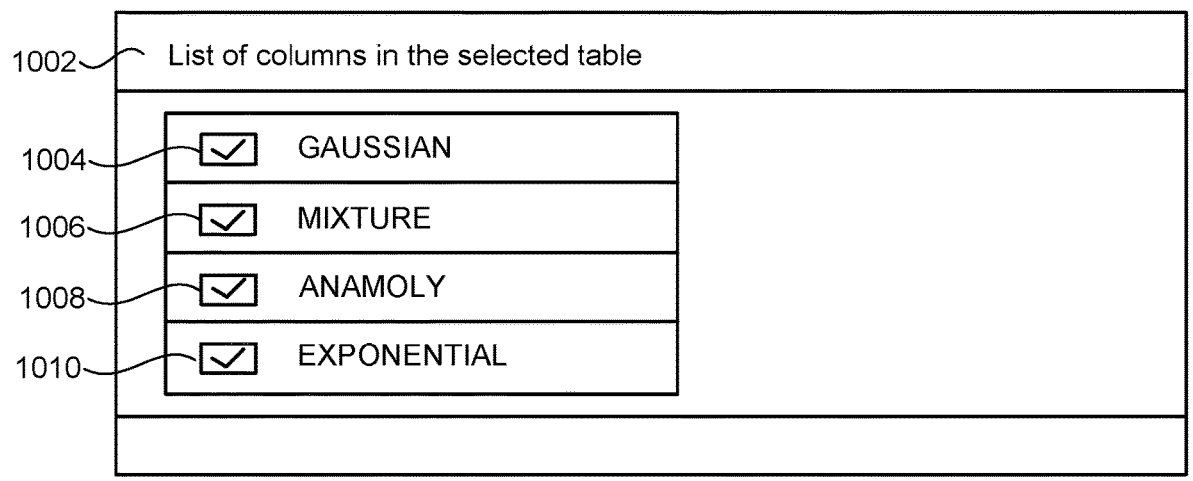
FIG. 10 is a screenshot of the column selection process of FIG. 9.

FIG. 10 is a screenshot 1000 illustrating the column selection process of FIG. 9. In the example of FIG. 10, a list 1002 of columns within a selected table is rendered. Within the list 1002, a column Gaussian 1004, mixture 1006, anomaly 1008, and exponential 1010 are each included as selectable columns of the selected table. In the example, the terms mixture, anomaly, and exponential refer to different types of well-known data distributions, which are provided for example and not described here in further detail. In FIG. 10, as shown, the columns 1004, 1006, 1008, and 1010 have been selected, using the provided checkbox functionality. Finally in FIG. 10, a button "next page" 1012 is illustrated, and represents a selectable button or other functionality by which the user may initiate a rendering process for rendering graphical representations of the selected columns.

Figure 11:
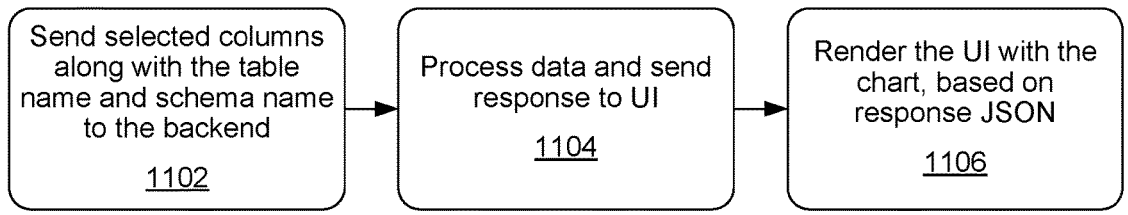
FIG. 11 is a flowchart illustrating a rendering process used with the architecture of FIG. 4.

In particular, FIG. 11 is a flowchart 1100 illustrating a rendering process used with the architecture of FIG. 4, and continuing the examples of FIGS. 4-10. As described with respect thereto, the frontend rendering process of the application client 418 is supported by data processing performed at the backend (e.g., using the application server 406 and the database layer 402). Specifically, the selected columns, table name, and schema name may be sent from the UI and the application client 418 to the application server 406 (1102). The received selections are then processed, so that a suitable response may be sent back to the application client 418, as described in detail, below (1104). Accordingly, one or more graphical representations illustrating the various, selected data distributions may be rendered, as illustrated below with respect to the example of FIG. 12 (1106).

For example, with respect to the backend service providing the referenced data processing, backend services may be written in HANA that receive the selected columns and dynamically calculate the various values and associated data needed for the requested rendering. For example, as may occur with respect to the example of FIG. 2, and/or with the respect to the example of FIG. 12, below, such a backend service may initially create a table for storing quartile data, and then proceed to calculate a minimum and maximum of all selected columns. Meanwhile, a table may also be created for storing the pixel to data count, in which a pixel to data ratio is calculated using the equation: ((data−global min)/(global max−global min))*range.

Figure 12:
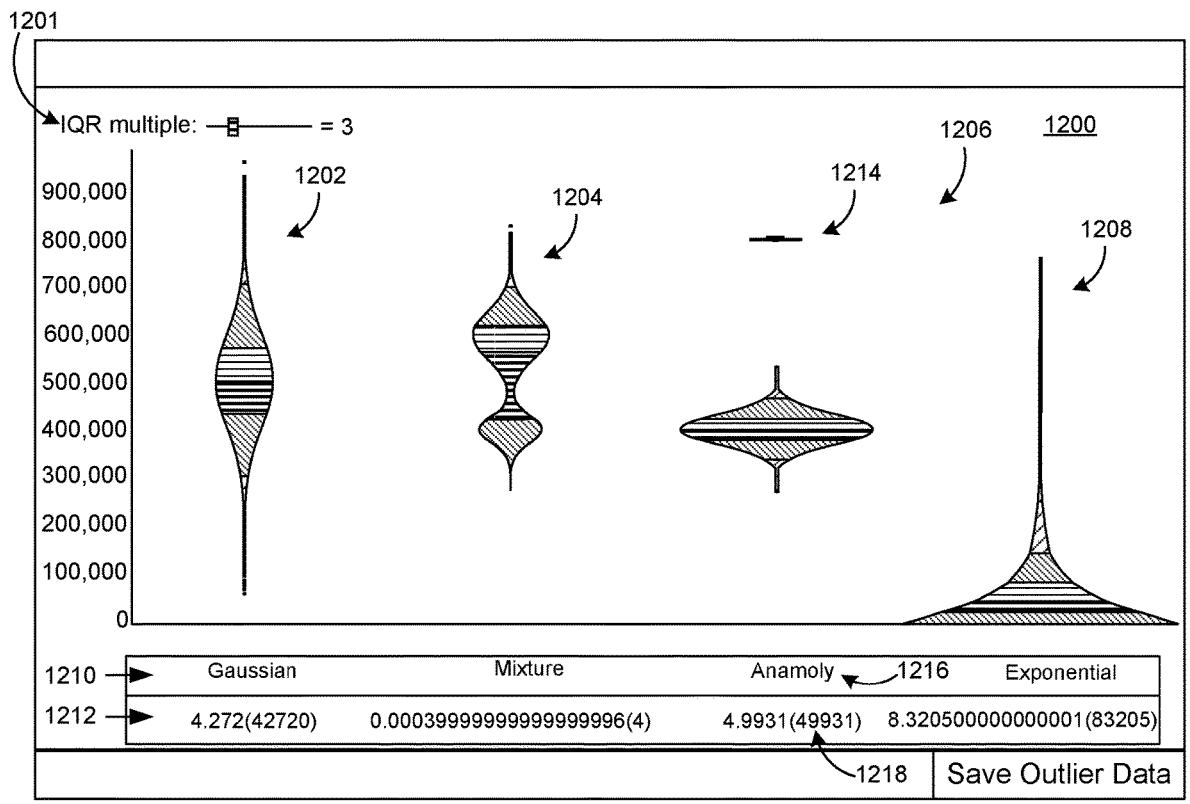
FIG. 12 is a screenshot of the rendering process of FIG. 11.

Then, a view may be created for storing categorized data as regular or outlier data. For example, an IQR value of an outlier value may be calculated. For situations in which data is less than the first quartile: 2*((first quartile−data)/IQR of that column)+1 may be used. When data is greater than the third quartile: 2*((data-third quartile)/IQR of that column)+1 may be used. The user may then save the data explicitly in a table, in a manner that is dependent on the determined category (e.g., regular or outlier), and with respect to the selected IQR multiple. In the example of FIG. 12, below, the IQR multiple is initially set to a value of 3.

In some examples, the resulting, calculated values may sent as a response from the backend to the frontend as a JSON object, i.e., as an object constructed using the JavaScript object notation. Such a JSON response object may include an array of each column's outlier count, and another array of the maximum and minimum data values in the selected columns. The JSON object may include each outlier count, as well as a percentage of data identified as outliers within a particular column. In the example of FIG. 12, the JSON object may include quartile data in the form of: lower number, Q1, Q2, Q3, higher number, and IQR value of each column.

FIG. 12 is a screenshot 1200 of the rendering process of FIG. 11. In the example of FIG. 12, the screenshot 1200 includes the provided IQR multiple 1201, which, as just referenced, may initially be set to a value of 3.

To render the screenshot 1200, as just referenced, the minimum and maximum data values of the selected columns may be utilized to render and enumerate the vertical axis. In this regard, it will be appreciated that since the example of FIG. 12 includes 4 different graphical representations of data distributions of 4 different columns, the minimum and maximum values must be selected across all of the selected columns.

The pixel to outlier count received from the backend as part of the JSON response object may be retrieved. Then, based on the number of columns selected, a total width and relative area allocated for each corresponding graphical representation of each selected column may be calculated. That is, for example, the example of FIG. 12 illustrates 4 graphical representations 1202, 1204, 1206, and 1208, corresponding to the underlying, selected columns. Based on a total pixel count and area available for rendering the screenshot 1200, a relative and absolute width and area of each of the graphical representations 1202, 1204, 1206, and 1208 may be calculated, in order to ensure that each is provided with a sufficient and satisfactory region of the available display to demonstrate its absolute and relative size and shape.

In the example of FIG. 12, a row 1210 includes identifications of types of distributions being graphed. Meanwhile, a row 1212 illustrates both a number of outlier values that result from the various selections made in conjunction with the rendering of the screenshot 1200, as well as the outlier values expressed as a percentage of the total of the selected data values for each column/distribution. To provide a more specific example, outlier values 1214 correspond to, and/or included in, an anomaly distribution 1216 of outlier values for the distribution 1206, as well as a number/percentage 1218 of outlier values for the distribution 1206.

Figure 13:
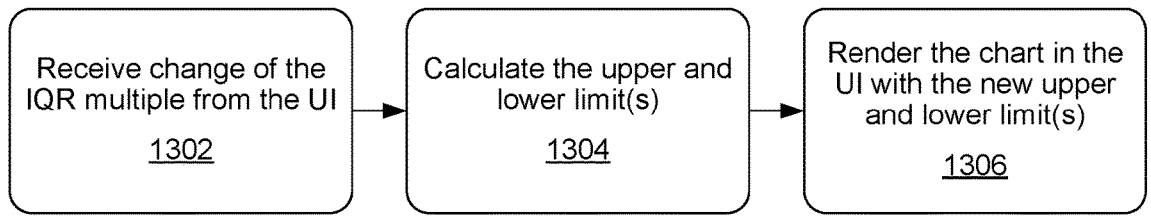
FIG. 13 is a flowchart illustrating an interactive nature of the rendering process of FIGS. 11 and 12.

FIG. 13 is a flowchart 1300 illustrating an interactive nature of the rendering process of FIGS. 11 and 12. In the example of FIG. 13, the user interface receives a change in the selected value of the IQR multiple 1201 of FIG. 12 (1302). The application client 418 provides the requested change to the application server 406, which then proceeds to calculate corresponding upper and lower limits (1304). For example, the lower limit may be calculated as: (first quartile)−((IQR multiple−1)/2*IQR), while the higher limit may be calculated as (third quartile)+((IQR_multiple−1)/ 2*IQR). Finally in FIG. 13, the resulting, updated chart may be rendered based on the newly-calculated upper and lower limits (1306), as illustrated and described below with respect to FIG. 14.

Figure 14:
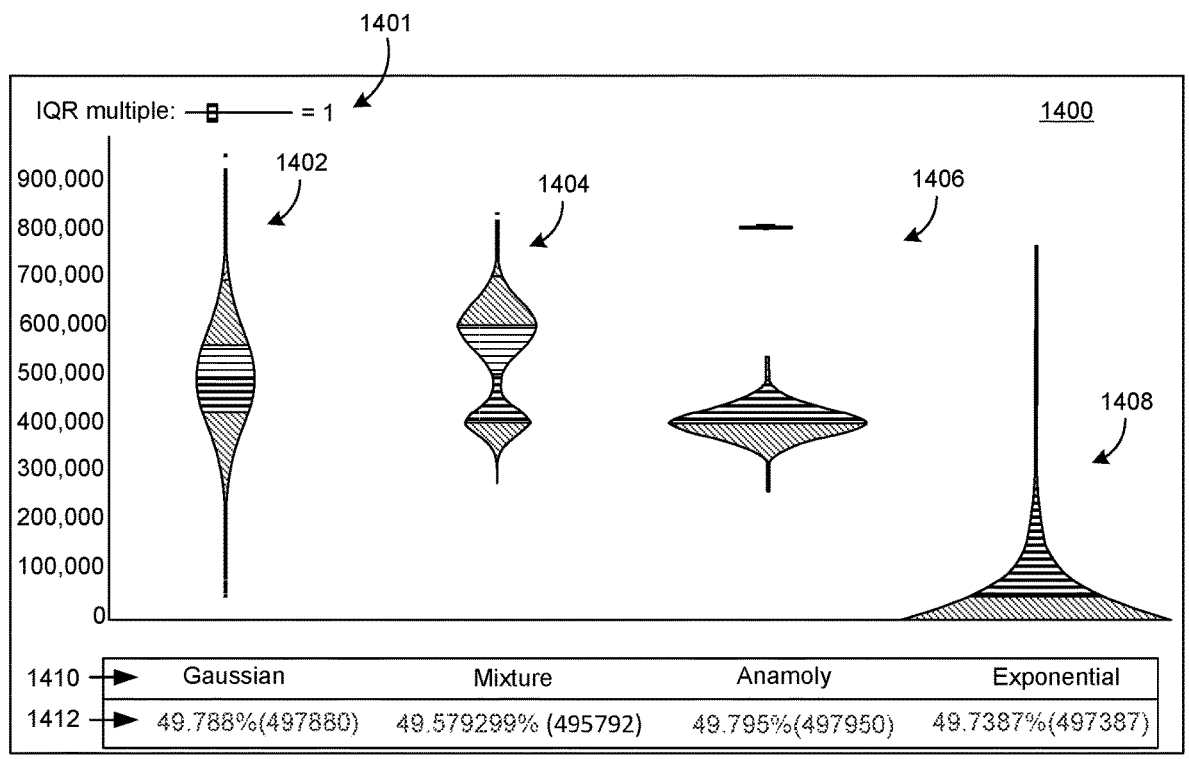
FIG. 14 is a screenshot of the rendering process of FIG. 13.

In FIG. 14, corresponding to the example just provided with respect to FIG. 13, the IQR multiple 1401 is reset from a value of 3 to a value of 1. Consequently, within the screenshot 1400, the various graphical representations 1402, 1404, 1406, and 1408 are dynamically re-rendered to reflect the updated IQR multiple 1401. A row 1410 includes identifications of types of distributions being graphed. A row 1412 includes a count of outlier values corresponding to each of the graphical representations 1402, 1404, 1406, and 1408, as well as corresponding percentage values for the identified outlier values of the graphical representations 1402, 1404, 1406, and 1408.

The user may be provided with an option to save the normal and outlier data for the selected columns. Specifically, as shown in the flowchart 1500 of FIG. 15, the user interface may make a service call to the application server 406 to save the outlier data (1502). At the backend application server, the outlier and normal data may be saved within corresponding tables (1504). The user may edit the name of the table to save the outlier and normal data for later analysis and usage.

Figure 15:
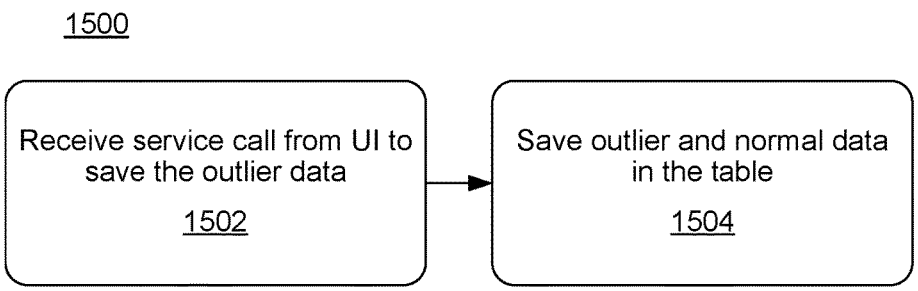
FIG. 15 is a flowchart illustrating a save process used with the architecture of FIG. 4.
Figure 16:
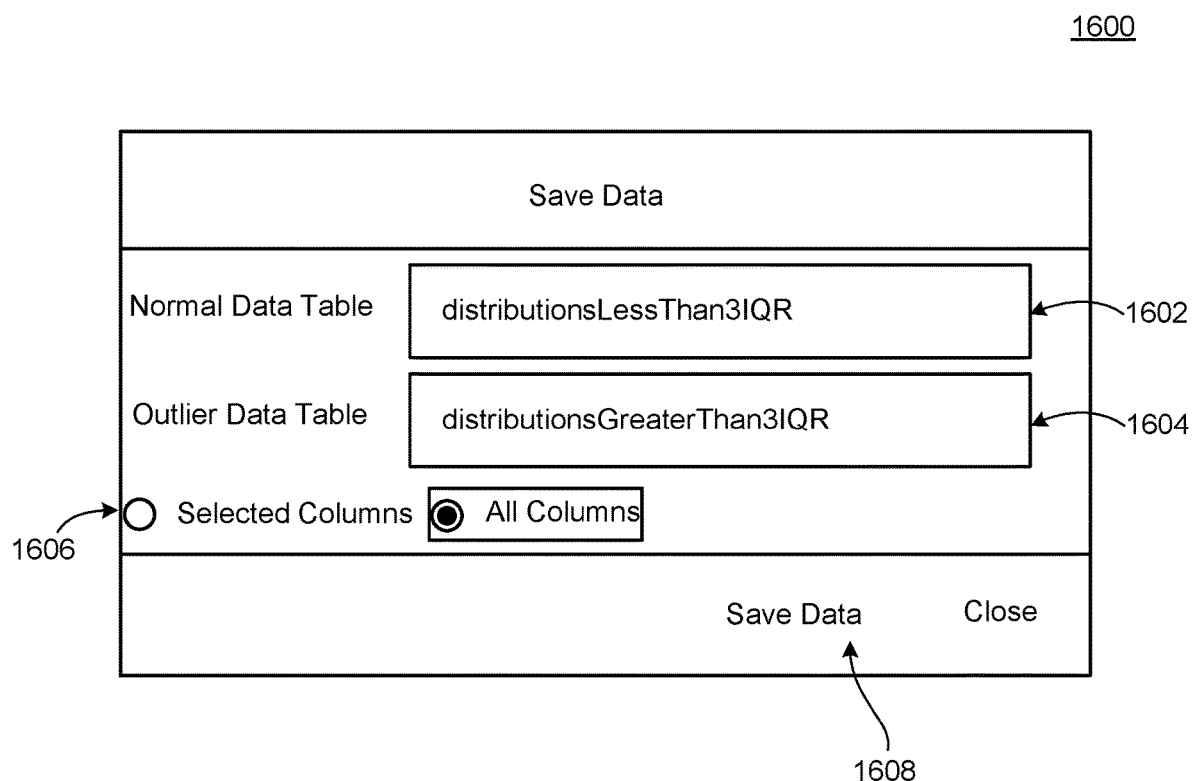
FIG. 16 is a screenshot of the save process of FIG. 15.

FIG. 16 is a screenshot 1600 illustrating the example save process of FIG. 15. In the example of FIG. 16, a field 1602 is utilized to identify and save normal data (e.g., with the outlier data filtered out), while a field 1604 is utilized to identify and save outlier data. In the example, a row 1606 provides the user with an ability to choose between saving the data for selected columns, or for all columns, where, as shown, the user has selected "all columns" in the example of FIG. 16. Finally in FIG. 16, the user is provided with an ability to utilize selection buttons 1608 to save the identified data and/or close the panel of the screenshot 1600.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or median of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to:
   receive a user selection of columns of data tables to select data values, the selected data values representing measurements taken over time from at least one sensor;
   render a graphical representation of a distribution of the selected data values, in which frequencies of the selected data values at corresponding included values of an available range of values are represented by extensions of the graphical representation in proportion to the frequencies and in parallel with a first axis, wherein the available range of values is illustrated along a second axis perpendicular to the first axis;
   render extensions of the graphical representation in a first value range of the graphical representation with a first visual designation;
   render extensions of the graphical representation in a second value range of the graphical representation with a second visual designation, wherein the first value range and the second value range are included in a total value range; and
   render an outlier limit defined by a user input with respect to the total value range, wherein extensions of the graphical representation in an outlier portion of the graphical representation, corresponding to at least one selected data value that is designated as an outlier value by virtue of being outside of the outlier limit, are rendered with a third visual designation selected by the user input,
   wherein the first value range, the second value range and the outlier portion are rendered with differing visual designations.

2. The computer program product of claim 1, wherein the instructions, when executed, are further configured to:
   receive an updated user input defining an updated outlier limit; and
   render an updated graphical representation with the updated outlier limit and associated update outlier value that is designated as such by virtue of being outside of the updated outlier limit.

3. The computer program product of claim 1, wherein the outlier limit is defined as a multiple of the total value range.

4. The computer program product of claim 1, wherein the instructions, when executed, are further configured to:
   calculate and render a number of outlier values outside of the outlier limit, including the outlier value, and a percentage of the selected data values represented by the number of outlier values.

5. The computer program product of claim 1, wherein the outlier value represents at least one of: a malfunction of the at least one sensor, or an erroneous configuration of the at least one sensor.

6. The computer program product of claim 1, wherein the first value range is a lower quartile range below a median value of the selected data values, the second value range is an upper quartile range above the median value, and the total value range is an interquartile range including both the lower quartile range and the upper quartile range.

7. The computer program product of claim 1, wherein the selected data values include first data values of a first column of at least one database table, and second data values of a second column of the at least one database table, and wherein the instructions, when executed, are further configured to:
   render the graphical representation as a first graphical representation, corresponding to the first column; and
   render a second graphical representation, corresponding to the second column,
   wherein the first graphical representation and the second graphical representation are rendered adjacent to one another and with respect to the first axis and the second axis.

8. The computer program product of claim 1, wherein the instructions, when executed, are further configured to:
   determine a pixel count of available pixels within a display for rendering the graphical representation;
   determine a ratio of a count of the selected data values per available pixel; and
   render the graphical representation based on the ratio, with each available pixel representing a number of selected data values corresponding to the count of the selected data values.

9. The computer program product of claim 1, wherein the instructions, when executed, are further configured to:
   calculate, at a back-end application server configured to retrieve the selected data values from at least one database, the data distribution including, for the selected data values, at least one array including: maximum and minimum values of the selected data values, the outlier limit, the first value range, the second value range, and the total value range.

10. The computer program product of claim 9, wherein the instructions, when executed, are further configured to:
    send the at least one array within a JavaScript Object Notation (JSON) object from the application server to a front-end rendering engine of an application client, for rendering of the graphical representation therewith.

11. A computer-implemented method, comprising:
    receiving a user selection of data values from a hierarchical user interface displaying data schemas, data tables, and data columns, the selected data values representing measurements taken over time from at least one sensor;
    rendering a graphical representation of a distribution of the selected data values, in which frequencies of the selected data values at corresponding included values of an available range of values are represented by extensions of the graphical representation in proportion to the frequencies and in parallel with a first axis, wherein the available range of values is illustrated along a second axis perpendicular to the first axis;
    rendering extensions of the graphical representation in a first value range of the graphical representation with a first visual designation;
    rendering extensions of the graphical representation in a second value range of the graphical representation with a second visual designation, wherein the first value range and the second value range are included in a total value range; and
    rendering an outlier limit defined by a user input with respect to the total value range, wherein extensions of the graphical representation in an outlier portion of the graphical representation, corresponding to at least one selected data value that is designated as an outlier value by virtue of being outside of the outlier limit, are rendered with a third visual designation selected by the user input, wherein the first value range, the second value range and the outlier portion are rendered with differing visual designations.

12. The computer-implemented method of claim 11, further comprising:
receiving an updated user input defining an updated outlier limit; and
rendering an updated graphical representation with the updated outlier limit and associated update outlier value that is designated as such by virtue of being outside of the updated outlier limit.

13. The computer-implemented method of claim 11, wherein the outlier limit is defined as a multiple of the total value range.

14. The computer-implemented method of claim 11, wherein the instructions, when executed, are further configured to:
calculate and render a number of outlier values outside of the outlier limit, including the outlier value, and a percentage of the selected data values represented by the number of outlier values.

15. The computer-implemented method of claim 11, wherein the first value range is a lower quartile range below a median value of the selected data values, the second value range is an upper quartile range above the median value, and the total value range is an interquartile range including both the lower quartile range and the upper quartile range.

16. The computer-implemented method of claim 11, wherein the instructions, when executed, are further configured to:
determine a pixel count of available pixels within a display for rendering the graphical representation;
determine a ratio of a count of the selected data values per available pixel; and
render the graphical representation based on the ratio, with each available pixel representing a number of selected data values corresponding to the count of the selected data values.

17. A computer program product, the computer program product being tangibly embodied on a non-transitory computer-readable storage medium and comprising instructions that, when executed, are configured to cause at least one computing device to:
render a user interface configured to receive user selections in a hierarchical fashion, the user selections including a data schema, a data table, and a data column to define a dataset;
calculate a count of each of a plurality of data values within the dataset;
render a graphical representation of a distribution of the dataset, in which each count for each data value of the plurality of data values is represented by a relatively proportional visual extent of the graphical representation;
calculate a total value range within a central portion of the graphical representation;
calculate an outlier limit defined as a multiple of the total value range;
render visual extents within the total value range with a total value identifying visual designation;
render a visual extent representing at least one outlier value of the plurality of data values, the outlier value being outside of the outlier limit, with an outlier identifying visual designation differing from the total value identifying visual designation;
receive, from a user interface, an update to the multiple of the total value range;
calculate an updated outlier limit, based on the updated multiple; and
render an updated graphical representation, including the updated outlier limit.

18. The computer program product of claim 17, wherein the updated graphical representation includes at least one updated outlier value that is outside of the updated outlier limit and that includes the outlier identifying visual designation.

19. The computer program product of claim 17, wherein the total value range includes a first value range that is a lower quartile range below a median value of the plurality of data values, and a second value range that is an upper quartile range above the median value, and further wherein the total value range is an interquartile range including both the lower quartile range and the upper quartile range.

20. The computer program product of claim 17, wherein the plurality of data values include measurements taken over time from at least one sensor, and wherein the at least one outlier value and the at least one updated outlier value represent at least one of: a malfunction of the at least one sensor, or an erroneous configuration of the at least one sensor.

* * * * *